United States Patent
Chahal et al.

(10) Patent No.: US 10,021,137 B2
(45) Date of Patent: Jul. 10, 2018

(54) REAL-TIME MOBILE SECURITY POSTURE

(71) Applicant: McAfee, LLC, Plano, TX (US)

(72) Inventors: Sudip Chahal, Gold River, CA (US); Igor Tatourian, Santa Clara, CA (US)

(73) Assignee: McAfee, LLC, Plano, TX (US)

( * ) Notice: Subject to any disclaimer, the term of this patent is extended or adjusted under 35 U.S.C. 154(b) by 111 days.

(21) Appl. No.: 14/583,687

(22) Filed: Dec. 27, 2014

(65) Prior Publication Data
US 2016/0191567 A1 Jun. 30, 2016

(51) Int. Cl.
- H04L 29/06 (2006.01)
- G06F 21/44 (2013.01)
- H04W 12/00 (2009.01)
- G06F 21/57 (2013.01)
- G06F 21/62 (2013.01)

(52) U.S. Cl.
CPC ............ H04L 63/20 (2013.01); G06F 21/44 (2013.01); G06F 21/57 (2013.01); G06F 21/6218 (2013.01); H04L 63/0823 (2013.01); H04L 63/1416 (2013.01); H04W 12/00 (2013.01)

(58) Field of Classification Search
CPC ...... H04L 63/20; H04L 63/10; H04L 63/0823
See application file for complete search history.

(56) References Cited

U.S. PATENT DOCUMENTS

| | | | |
|---|---|---|---|
| 5,987,610 A | 11/1999 | Franczek et al. | |
| 6,073,142 A | 6/2000 | Geiger et al. | |
| 6,460,050 B1 | 10/2002 | Pace et al. | |
| 7,506,155 B1 | 3/2009 | Stewart et al. | |
| 8,205,247 B2 | 6/2012 | Lexcellent et al. | |
| 8,494,485 B1* | 7/2013 | Broch | H04L 9/3263 370/329 |
| 8,806,596 B2 | 8/2014 | Seidl et al. | |
| 8,813,179 B1 | 8/2014 | Qureshi | |
| 2002/0007456 A1* | 1/2002 | Peinado | G06F 21/10 713/164 |
| 2005/0015624 A1* | 1/2005 | Ginter | G06F 21/55 726/4 |

(Continued)

FOREIGN PATENT DOCUMENTS

WO 2016105936 6/2016

OTHER PUBLICATIONS

International Search Report and Written Opinion in International Application No. PCT/US2015/064579 dated Apr. 1, 2016; 10 pages.

(Continued)

*Primary Examiner* — Jason K Gee
(74) *Attorney, Agent, or Firm* — Patent Capital Group

(57) ABSTRACT

In an example, a system and method for real-time mobile security posture updates is provided. A mobile device management (MDM) agent may run on the mobile device, and may register with the operating system one or more mobile security posture change events that may affect the mobile security posture. These may include, for example, installation of an MDM agent, uninstallation of a program, connecting to a secured or unsecured network, or similar. When any such event occurs, the OS lodges the event with the MDM agent, which then communicates with an MDM server engine to potentially receive new security instructions. Lodging the event may include providing a joint user-and-device authentication to the MDM server, such as via SAML.

23 Claims, 5 Drawing Sheets

(56) References Cited

U.S. PATENT DOCUMENTS

| | | | |
|---|---|---|---|
| 2006/0047805 A1 | 3/2006 | Byrd et al. | |
| 2006/0129803 A1 | 6/2006 | Gentry et al. | |
| 2007/0266422 A1* | 11/2007 | Germano | H04L 63/0263 726/1 |
| 2010/0192214 A1 | 7/2010 | Ohno et al. | |
| 2014/0150049 A1* | 5/2014 | Kwon | H04L 63/1416 726/1 |
| 2014/0366111 A1* | 12/2014 | Sheller | H04L 63/08 726/7 |
| 2015/0007350 A1* | 1/2015 | Gudipati | G06F 21/54 726/30 |
| 2016/0099969 A1* | 4/2016 | Angus | H04L 63/0876 713/158 |
| 2017/0149839 A1 | 5/2017 | Chahal et al. | |

OTHER PUBLICATIONS

International Preliminary Report on Patentability issued in International Application No. PCT/US2015/064579 dated Jun. 27, 2017.
USPTO Non-Final Office Action issued in U.S. Appl. No. 15/425,208 dated Aug. 3, 2017; 21 pages.
USPTO Final Office Action issued in U.S. Appl. No. 15/425,208 dated Nov. 20, 2017; 18 pages.
USPTO Nonfinal Rejection issued in U.S. Appl. No. 15/425,208 dated Apr. 19, 2018; 15 pages.

* cited by examiner

REAL-TIME MOBILE SECURITY POSTURE

FIELD OF THE DISCLOSURE

This application relates to the field of computer security, and more particularly to a device and method for real-time mobile security posture.

BACKGROUND

Security Assertion Markup Language (SAML) is an XML-based, open-standard data format for exchanging authentication and authorization data between parties, in particular, between an identity provider and a service provider. SAML addresses, in particular, web browser single sign-on (SSO). The SAML specification defines three roles: a principal (for example, a user), and identity provider (IdP), and a service provider (SP). In an example authentication, the principal requests a service from the SP. The SP requests and receives an identity assertion from the IdP. On the basis of this assertion, the service provider may decide whether to grant access to a resource or not.

Before delivering an identity assertion to the SP, the IdP may request some information from the principal, such as a username and password, an authentication token, a two-factor authentication, or other authentication data. (SAML does not specify a required method of authentication at the identity provider.) SAML specifies the assertions between the three parties, particularly the messages that assert identity that are passed from the IdP to the SP. In SAML, one identity provider may provide SAML assertions to many service providers. Similarly, one SP may rely on and trust assertions from many independent IdPs.

BRIEF DESCRIPTION OF THE DRAWINGS

The present disclosure is best understood from the following detailed description when read with the accompanying figures. It is emphasized that, in accordance with the standard practice in the industry, various features are not drawn to scale and are used for illustration purposes only. In fact, the dimensions of the various features may be arbitrarily increased or reduced for clarity of discussion.

DETAILED DESCRIPTION OF THE EMBODIMENTS

Overview

Figure 1:
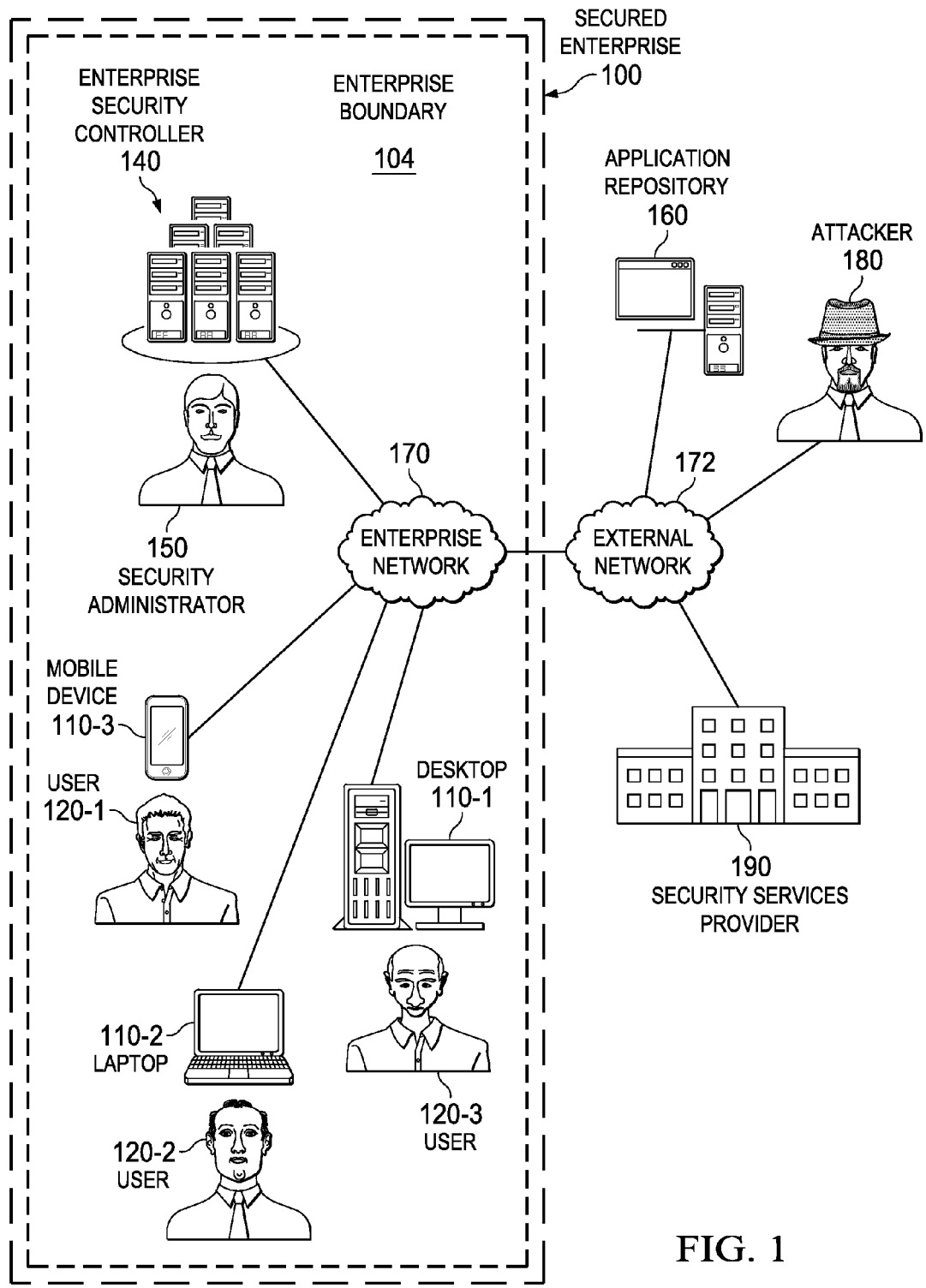
FIG. 1 is a block diagram of a security-enabled network according to one or more examples of the present Specification.

In an example, a system and method for real-time mobile security posture updates is provided. A mobile device management (MDM) agent may run on the mobile device, and may register with the operating system one or more mobile security posture change events that may affect the mobile security posture. These may include, for example, installation of an MDM agent, uninstallation of a program, connecting to a secured or unsecured network, or similar. When any such event occurs, the OS lodges the event with the MDM agent, which then communicates with an MDM server engine to potentially receive new security instructions. Lodging the event may include providing a joint user-and-device authentication to the MDM server, such as via SAML.

Example Embodiments of the Disclosure

The following disclosure provides many different embodiments, or examples, for implementing different features of the present disclosure. Specific examples of components and arrangements are described below to simplify the present disclosure. These are, of course, merely examples and are not intended to be limiting. Further, the present disclosure may repeat reference numerals and/or letters in the various examples. This repetition is for the purpose of simplicity and clarity and does not in itself dictate a relationship between the various embodiments and/or configurations discussed.

Different embodiments many have different advantages, and no particular advantage is necessarily required of any embodiment.

A modern trend in enterprise computing is the so-called "bring your own device" (BYOD) model. In BYOD, users may own and provide their own devices, including laptop computers, smartphones, tablets, and other similar devices. This can simplify enterprise IT budgets and policy, because enterprise IT departments do not need to define policies for which specific devices to use, purchase one device for each user, and then configure and manage all the devices.

However, BYOD does have some shortfalls. Because BYOD is inherently democratic, the enterprise gives up tight control over which software may be installed on the device. In a BYOD environment, users may have games, personal applications, personal utilities, and any other application on the device. This can present a security concern for the enterprise. Specifically, users may use their devices to access enterprise data, including email and shared enterprise files. If user devices are not properly secured or become infected with malware, enterprise data may be compromised.

To help prevent enterprise data loss, users in a BYOD environment may be required to install a mobile device management (MDM) agent on their mobile devices. The MDM agents may run as a privileged process and may be configured to enforce selected enterprise IT policies, such as requiring user devices to have suitably strong passcodes or other security mechanisms consistent with enterprise security policies.

In one example, each user may initially register his device with an enterprise security controller, which may provide a certificate to the device. The certificate remains valid only so long as the device continues to meet enterprise security policies. If the device ceases to meet those requirements, then the certificate may be revoked along with the user's access to enterprise resources.

For example, if a user ends his employment with the enterprise, his certificate may be revoked so that he can no longer receive enterprise email, or login to enterprise resources. Other events may also affect enterprise security compliance. For example, if the user uninstalls or disables the MDM agent, then the user certificate may no longer be considered valid. In other examples, if the user installs certain blacklisted programs, the certificate may be revoked. In yet other examples, the use of certain enterprise resources may be restricted to times when the user is physically on company property, or within certain areas of an office. In another example, the certificate may be revoked if a candidate malicious object or other security object that has not been properly characterized is found on the device. In another example, the user may access enterprise resources only so long as he provides a proper biometric authentication. For example, a user may share a device with one or more non-enterprise users, such as a spouse or a child. When the other person is using the device, the biometric authentication will not match, and the device will not be able to access enterprise resources. Any of the foregoing may be considered security posture change events. In some cases, upon the occurrence of a security posture change event, a joint user-and-device authentication may be required so that an enterprise MDM server can construct an appropriate updated security profile and make decisions about whether, and to what extent, to continue granting access to enterprise resources.

In one example, upon detecting a change in security posture, the MDM agent may provide an authentication token, such as via security attestation markup language (SAML). Advantageously, the SAML token may provide not only authentication for the user and the device, but may also contain information about the new security posture.

Upon receiving authentication for the user and the device, the MDM server may construct a policy decision based on the new security posture and provide the new decision back to the device. The MDM server may also enforce the new policy locally on the enterprise network. For example, if the new device security posture is such that the mobile device should be denied access to enterprise resources, then devices access to those resources may be revoked.

Advantageously, in certain embodiments of the present specification changes in mobile device security posture may be detected in real-time or in near real-time. For example, in one example, the MDM agent runs as a "daemon" process that continuously monitors a number of factors and is prepared to report changes in the security posture to the MDM server. The MDM agent may run as a privileged process, for example in "ring 0" so that it can detect all species of relevant events. In other examples, the MDM agent may run in a trusted execution environment (TEE), such as within a memory enclave, or on a secure coprocessor such as is provided by the Intel® vPro™ architecture. This may help to ensure that malware objects cannot tamper with the MDM agent.

It is also recognized herein that in some cases, constant monitoring by the MDM agent may be impractical for mobile devices. Specifically, in mobile devices power consumption is at a premium. Thus, having a daemon process running in the background at all times monitoring a number of processes may prove to be an unacceptable drain on battery life.

To address this difficulty, in certain embodiments, the MDM agent may register a series of events with the operating system, and then enter a "sleep" mode. The operating system itself may then monitor the device to detect the occurrence of any of these events. If any event occurs, the operating system wakes the MDM agent, and the MDM agent reports the change in security posture to the MDM server.

A system and method of real-time mobile security posture updates will now be described with more particular reference to the appended FIGURES. Throughout the FIGURES, common numerals are used to specify common elements across multiple FIGURES. However, this is not intended to imply a necessary or strict relationship between different embodiments disclosed herein. In some cases, one or more different examples or species of the same elements may be referred to in a hyphenated form. Thus, for example, the numerals 1xx-1 and 1xx-2 may refer to two different species or examples of a class of objects referred to as 1xx.

FIG. 1 is a network-level diagram of a secured enterprise 100 according to one or more examples of the present Specification. In the example of FIG. 1, a plurality of users 120 operate a plurality of client devices 110. Specifically, user 120-1 operates desktop computer 110-1. User 120-2 operates laptop computer 110-2. And user 120-3 operates mobile device 110-3.

Each computing device may include an appropriate operating system, such as Microsoft Windows, Linux, Android, Mac OSX, Apple iOS, Unix, or similar. Some of the foregoing may be more often used on one type of device than another. For example, desktop computer 110-1, which in one embodiment may be an engineering workstation, may be more likely to use one of Microsoft Windows, Linux, Unix, or Mac OSX. Laptop computer 110-2, which is usually a portable off-the-shelf device with fewer customization options, may be more likely to run Microsoft Windows or Mac OSX. Mobile device 110-3 may be more likely to run Android or iOS. However, these examples are not intended to be limiting.

Client devices 110 may be communicatively coupled to one another and to other network resources via enterprise network 170. Enterprise network 170 may be any suitable network or combination of one or more networks operating on one or more suitable networking protocols, including for example, a local area network, an intranet, a virtual network, a wide area network, a wireless network, a cellular network, or the Internet (optionally accessed via a proxy, virtual machine, or other similar security mechanism) by way of nonlimiting example. Enterprise network 170 may also include one or more servers, firewalls, routers, switches, security appliances, antivirus servers, or other useful network devices. In this illustration, enterprise network 170 is shown as a single network for simplicity, but in some embodiments, enterprise network 170 may include a large number of networks, such as one or more enterprise intranets connected to the internet. Enterprise network 170 may also provide access to an external network, such as the Internet, via external network 172. External network 172 may similarly be any suitable type of network.

One or more computing devices configured as an enterprise security controller (ESC) 140 may also operate on enterprise network 170. ESC 140 may provide a user interface for an awesome security administrator 150 to define enterprise security policies, which ESC 140 may enforce on enterprise network 170 and across client devices 120.

Secured enterprise 100 may encounter a variety of "security objects" on the network. A security object may be any object that operates on or interacts with enterprise network 170 and that has actual or potential security implications. In one example, object may be broadly divided into hardware objects, including any physical device that communicates with or operates via the network, and software objects. Software objects may be further subdivided as "executable objects" and "static objects." Executable objects include any object that can actively execute code or operate autonomously, such as applications, drivers, programs, executables, libraries, processes, runtimes, scripts, macros, binaries, interpreters, interpreted language files, configuration files with inline code, embedded code, and firmware instructions by way of non-limiting example. A static object may be broadly designated as any object that is not an executable object or that cannot execute, such as documents, pictures, music files, text files, configuration files without inline code, videos, and drawings by way of non-limiting example. In some cases, hybrid software objects may also be provided, such as for example a word processing document with built-in macros or an animation with inline code. For security purposes, these may be considered as a separate class of software object, or may simply be treated as executable objects.

Enterprise security policies may include authentication policies, network usage policies, network resource quotas, antivirus policies, and restrictions on executable objects on client devices 110 by way of non-limiting example. Various network servers may provide substantive services such as routing, networking, enterprise data services, and enterprise applications.

Secure enterprise 100 may communicate across enterprise boundary 104 with external network 172. Enterprise boundary 104 may represent a physical, logical, or other boundary. External network 172 may include, for example, websites, servers, network protocols, and other network-based services. In one example, an application repository 160 is available via external network 172, and an attacker 180 (or other similar malicious or negligent actor) also connects to external network 172.

It may be a goal of users 120 and secure enterprise 100 to successfully operate client devices 110 without interference from attacker 180 or from unwanted security objects. In one example, attacker 180 is a malware author whose goal or purpose is to cause malicious harm or mischief. The malicious harm or mischief may take the form of installing root kits or other malware on client devices 110 to tamper with the system, installing spyware or adware to collect personal and commercial data, defacing websites, operating a botnet such as a spam server, or simply to annoy and harass users 120. Thus, one aim of attacker 180 may be to install his malware on one or more client devices 110. As used throughout this Specification, malicious software ("malware") includes any security object configured to provide unwanted results or do unwanted work. In many cases, malware objects will be executable objects, including by way of non-limiting examples, viruses, trojans, zombies, rootkits, backdoors, worms, spyware, adware, ransomware, dialers, payloads, malicious browser helper objects, tracking cookies, loggers, or similar objects designed to take a potentially-unwanted action, including by way of non-limiting example data destruction, covert data collection, browser hijacking, network proxy or redirection, covert tracking, data logging, keylogging, excessive or deliberate barriers to removal, contact harvesting, and unauthorized self-propagation.

Attacker 180 may also want to commit industrial or other espionage against secured enterprise 100, such as stealing classified or proprietary data, stealing identities, or gaining unauthorized access to enterprise resources. Thus, attacker 180's strategy may also include trying to gain physical access to one or more client devices 110 and operating them without authorization, so that an effective security policy may also include provisions for preventing such access.

In another example, a software developer may not explicitly have malicious intent, but may develop software that poses a security risk. For example, a well-known and often-exploited security flaw is the so-called buffer overrun, in which a malicious user is able to enter an overlong string into an input form and thus gain the ability to execute arbitrary instructions or operate with elevated privileges on a computing device 200. Buffer overruns may be the result, for example, of poor input validation or use of insecure libraries, and in many cases arise in nonobvious contexts. Thus, although not malicious himself, a developer contributing software to application repository 160 may inadvertently provide attack vectors for attacker 180. Poorly-written applications may also cause inherent problems, such as crashes, data loss, or other undesirable behavior. Because such software may be desirable itself, it may be beneficial for developers to occasionally provide updates or patches that repair vulnerabilities as they become known. However, from a security perspective, these updates and patches are essentially new Application repository 160 may represent a Windows or Apple "app store" or update service, a Unix-like repository or ports collection, or other network service providing users 120 the ability to interactively or automatically download and install applications on client devices 110. If application repository 160 has security measures in place that make it difficult for attacker 180 to distribute overtly malicious software, attacker 180 may instead stealthily insert vulnerabilities into apparently-beneficial applications.

In some cases, secured enterprise 100 may provide policy directives that restrict the types of applications that can be installed from application repository 160. Thus, application repository 160 may include software that is not negligently developed and is not malware, but that is nevertheless against policy. For example, some enterprises restrict installation of entertainment software like media players and games. Thus, even a secure media player or game may be unsuitable for an enterprise computer. Security administrator 150 may be responsible for distributing a computing policy consistent with such restrictions and enforcing it on client devices 120.

Secured enterprise 100 may also contract with or subscribe to a security services provider 190, which may provide security services, updates, antivirus definitions, patches, products, and services. McAfee®, Inc. is a non-limiting example of such a security services provider that offers comprehensive security and antivirus solutions. In some cases, security services provider 190 may include a threat intelligence capability such as the global threat intelligence (GTI™) database provided by McAfee Inc. Security services provider 190 may update its threat intelligence database by analyzing new candidate malicious objects as they appear on client networks and characterizing them as malicious or benign.

In another example, secured enterprise 100 may simply be a family, with parents assuming the role of security administrator 150. The parents may wish to protect their children from undesirable content, such as pornography, adware, spyware, age-inappropriate content, advocacy for certain political, religious, or social movements, or forums for discussing illegal or dangerous activities, by way of non-limiting example. In this case, the parent may perform some or all of the duties of security administrator 150.

Collectively, any object that is or can be designated as belonging to any of the foregoing classes of undesirable objects may be classified as a malicious object. When an unknown object is encountered within secured enterprise 100, it may be initially classified as a "candidate malicious object." This designation may be to ensure that it is not granted full network privileges until the object is further analyzed. Thus, it is a goal of users 120 and security administrator 150 to configure and operate client devices 110 and enterprise network 170 so as to exclude all malicious objects, and to promptly and accurately classify candidate malicious objects.

Figure 2:
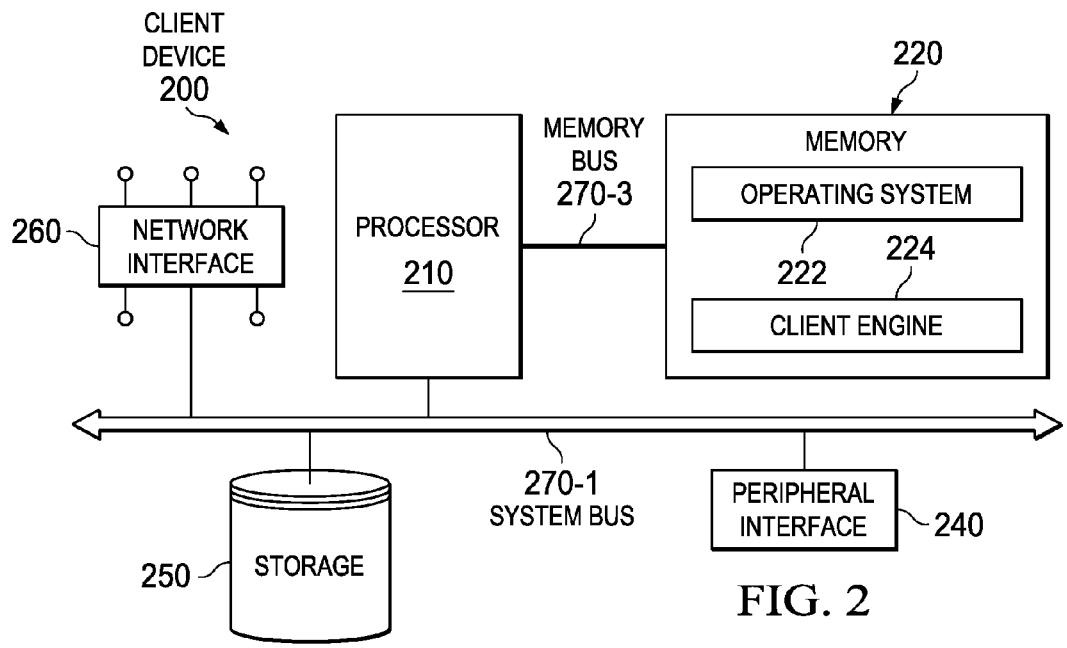
FIG. 2 is a block diagram of a computing device according to one or more examples of the present Specification.

FIG. 2 is a block diagram of computing device 200 according to one or more examples of the present Specification. Computing device 200 may be any suitable computing device. In various embodiments, a "computing device" may be or comprise, by way of non-limiting example, a computer, workstation, server, mainframe, embedded computer, embedded controller, embedded sensor, personal digital assistant, laptop computer, cellular telephone, IP telephone, smart phone, tablet computer, convertible tablet computer, computing appliance, network appliance, receiver, wearable computer, handheld calculator, or any other electronic, microelectronic, or microelectromechanical device for processing and communicating data.

In certain embodiments, client devices 110 may all be examples of computing devices 200.

Computing device 200 includes a processor 210 connected to a memory 220, having stored therein executable instructions for providing an operating system 222 and at least software portions of a client engine 224. Other components of computing device 200 include a storage 250, network interface 260, and peripheral interface 240. This architecture is provided by way of example only, and is intended to be non-exclusive and non-limiting. Furthermore, the various parts disclosed are intended to be logical divisions only, and need not necessarily represent physically separate hardware and/or software components. Certain computing devices provide main memory 220 and storage 250, for example, in a single physical memory device, and in other cases, memory 220 and/or storage 250 are functionally distributed across many physical devices. In the case of virtual machines or hypervisors, all or part of a function may be provided in the form of software or firmware running over a virtualization layer to provide the disclosed logical function. In other examples, a device such as a network interface 260 may provide only the minimum hardware interfaces necessary to perform its logical operation, and may rely on a software driver to provide additional necessary logic. Thus, each logical block disclosed herein is broadly intended to include one or more logic elements configured and operable for providing the disclosed logical operation of that block. As used throughout this Specification, "logic elements" may include hardware, external hardware (digital, analog, or mixed-signal), software, reciprocating software, services, drivers, interfaces, components, modules, algorithms, sensors, components, firmware, microcode, programmable logic, or objects that can coordinate to achieve a logical operation.

In an example, processor 210 is communicatively coupled to memory 220 via memory bus 270-3, which may be for example a direct memory access (DMA) bus by way of example, though other memory architectures are possible, including ones in which memory 220 communicates with processor 210 via system bus 270-1 or some other bus. Processor 210 may be communicatively coupled to other devices via a system bus 270-1. As used throughout this Specification, a "bus" includes any wired or wireless interconnection line, network, connection, bundle, single bus, multiple buses, crossbar network, single-stage network, multistage network or other conduction medium operable to carry data, signals, or power between parts of a computing device, or between computing devices. It should be noted that these uses are disclosed by way of non-limiting example only, and that some embodiments may omit one or more of the foregoing buses, while others may employ additional or different buses.

In various examples, a "processor" may include any combination of logic elements, including by way of non-limiting example a microprocessor, digital signal processor, field-programmable gate array, graphics processing unit, programmable logic array, application-specific integrated circuit, or virtual machine processor. In certain architectures, a multi-core processor may be provided, in which case processor 210 may be treated as only one core of a multi-core processor, or may be treated as the entire multi-core processor, as appropriate. In some embodiments, one or more co-processor may also be provided for specialized or support functions.

Processor 210 may be connected to memory 220 in a DMA configuration via DMA bus 270-3. To simplify this disclosure, memory 220 is disclosed as a single logical block, but in a physical embodiment may include one or more blocks of any suitable volatile or non-volatile memory technology or technologies, including for example DDR RAM, SRAM, DRAM, cache, L1 or L2 memory, on-chip memory, registers, flash, ROM, optical media, virtual memory regions, magnetic or tape memory, or similar. In certain embodiments, memory 220 may comprise a relatively low-latency volatile main memory, while storage 250 may comprise a relatively higher-latency non-volatile memory. However, memory 220 and storage 250 need not be physically separate devices, and in some examples may represent simply a logical separation of function. It should also be noted that although DMA is disclosed by way of non-limiting example, DMA is not the only protocol consistent with this Specification, and that other memory architectures are available.

Storage 250 may be any species of memory 220, or may be a separate device. Storage 250 may include one or more non-transitory computer-readable mediums, including by way of non-limiting example, a hard drive, solid-state drive, external storage, redundant array of independent disks (RAID), network-attached storage, optical storage, tape drive, backup system, cloud storage, or any combination of the foregoing. Storage 250 may be, or may include therein, a database or databases or data stored in other configurations, and may include a stored copy of operational software such as operating system 222 and software portions of client engine 224. Many other configurations are also possible, and are intended to be encompassed within the broad scope of this Specification.

Network interface 260 may be provided to communicatively couple computing device 200 to a wired or wireless network. A "network," as used throughout this Specification, may include any communicative platform operable to exchange data or information within or between computing devices, including by way of non-limiting example, an ad-hoc local network, an internet architecture providing computing devices with the ability to electronically interact, a plain old telephone system (POTS), which computing devices could use to perform transactions in which they may be assisted by human operators or in which they may manually key data into a telephone or other suitable electronic equipment, any packet data network (PDN) offering a communications interface or exchange between any two nodes in a system, or any local area network (LAN), metropolitan area network (MAN), wide area network (WAN), wireless local area network (WLAN), virtual private network (VPN), intranet, or any other appropriate architecture or system that facilitates communications in a network or telephonic environment.

Client engine 224, in one example, is operable to carry out computer-implemented methods as described in this Specification. Client engine 224 may include one or more non-transitory computer-readable mediums having stored thereon executable instructions operable to instruct a processor to provide a security engine. As used throughout this Specification, an "engine" includes any combination of one or more logic elements, of similar or dissimilar species, operable for and configured to perform one or more methods provided by client engine 224. Thus, client engine 224 may comprise one or more logic elements configured to provide methods as disclosed in this Specification. In some cases, client engine 224 may include a special integrated circuit designed to carry out a method or a part thereof, and may also include software instructions operable to instruct a processor to perform the method. In some cases, client engine 224 may run as a "daemon" process. A "daemon" may include any program or series of executable instructions, whether implemented in hardware, software, firmware, or any combination thereof, that runs as a background process, a terminate-and-stay-resident program, a service, system extension, control panel, bootup procedure, BIOS subroutine, or any similar program that operates without direct user interaction. In certain embodiments, daemon processes may run with elevated privileges in a "driver space," or in ring 0, 1, or 2 in a protection ring architecture. It should also be noted that client engine 224 may also include other hardware and software, including configuration files, registry entries, and interactive or user-mode software by way of non-limiting example.

In one example, client engine 224 includes executable instructions stored on a non-transitory medium operable to perform a method according to this Specification. At an appropriate time, such as upon booting computing device 200 or upon a command from operating system 222 or a user 120, processor 210 may retrieve a copy of client engine 224 (or software portions thereof) from storage 250 and load it into memory 220. Processor 210 may then iteratively execute the instructions of client engine 224 to provide the desired method.

In certain embodiments, client engine 224 may comprise an MDM agent, and any supporting programs to provide MDM agent services as described herein.

Peripheral interface 240 may be configured to interface with any auxiliary device that connects to computing device 200 but that is not necessarily a part of the core architecture of computing device 200. A peripheral may be operable to provide extended functionality to computing device 200, and may or may not be wholly dependent on computing device 200. In some cases, a peripheral may be a computing device in its own right. Peripherals may include input and output devices such as displays, terminals, printers, keyboards, mice, modems, network controllers, sensors, transducers, actuators, controllers, data acquisition buses, cameras, microphones, speakers, or external storage by way of non-limiting example.

Figure 3:
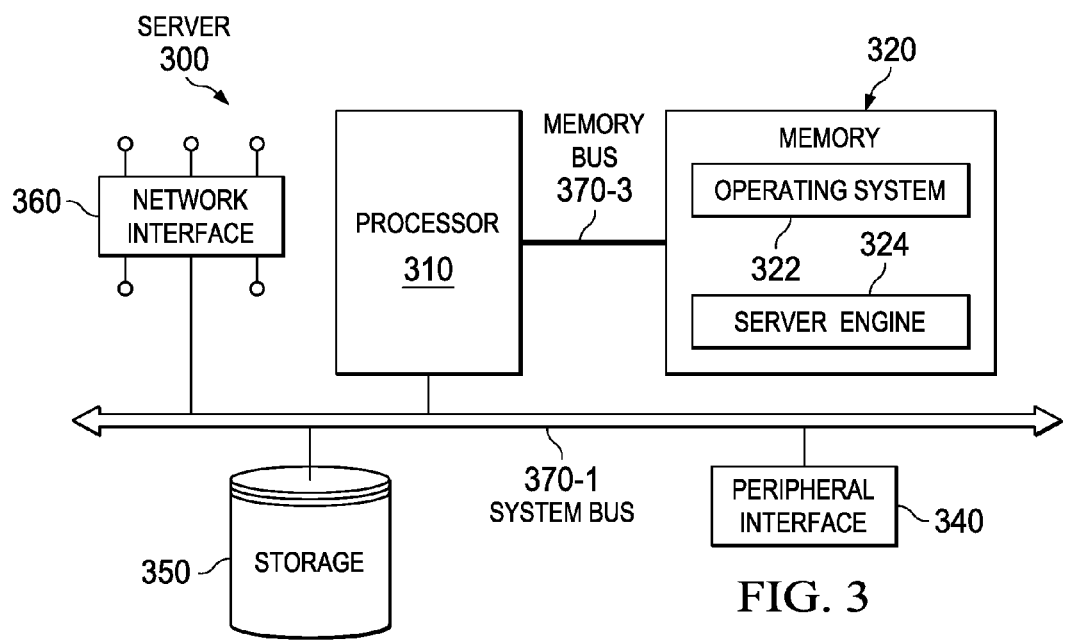
FIG. 3 is a block diagram of a server according to one or more examples of the present Specification.

FIG. 3 is a block diagram of server-class computer 300 according to one or more examples of the present Specification. Server 300 may be any suitable computing device, as described in connection with FIG. 2. In general, the definitions and examples of FIG. 2 may be considered as equally applicable to FIG. 3, unless specifically stated otherwise. Server 300 is described herein separately to illustrate that in certain embodiments, logical operations according to this Specification may be divided along a client-server model, wherein computing device 200 provides certain localized tasks, while server 300 provides certain other centralized tasks. Enterprise security controller 140, along with identity provider 520 of FIG. 5, and device security posture assessment 630 of FIG. 7 may be, or comprise, servers 300.

Server 300 includes a processor 310 connected to a memory 320, having stored therein executable instructions for providing an operating system 322 and at least software portions of a server engine 324. Other components of server 300 include a storage 350, network interface 360, and peripheral interface 340. As described in FIG. 2, each logical block may be provided by one or more similar or dissimilar logic elements.

In an example, processor 310 is communicatively coupled to memory 320 via memory bus 370-3, which may be for example a direct memory access (DMA) bus. Processor 310 may be communicatively coupled to other devices via a system bus 370-1.

Processor 310 may be connected to memory 320 in a DMA configuration via DMA bus 370-3, or via any other suitable memory configuration. As discussed in FIG. 2, memory 320 may include one or more logic elements of any suitable type.

Storage 350 may be any species of memory 320, or may be a separate device, as described in connection with storage 250 of FIG. 2. Storage 350 may be, or may include therein, a database or databases or data stored in other configurations, and may include a stored copy of operational software such as operating system 322 and software portions of server engine 324.

Network interface 360 may be provided to communicatively couple server 300 to a wired or wireless network, and may include one or more logic elements as described in FIG. 2.

Server engine 324 is an engine as described in FIG. 2 and, in one example, includes one or more logic elements operable to carry out computer-implemented methods as described in this Specification. Software portions of server engine 324 may run as a daemon process.

Server engine 324 may include one or more non-transitory computer-readable mediums having stored thereon executable instructions operable to instruct a processor to provide a security engine. At an appropriate time, such as upon booting server 300 or upon a command from operating system 222 or a user 120 or security administrator 150, processor 310 may retrieve a copy of server engine 324 (or software portions thereof) from storage 350 and load it into memory 320. Processor 310 may then iteratively execute the instructions of server engine 324 to provide the desired method.

Figure 4:
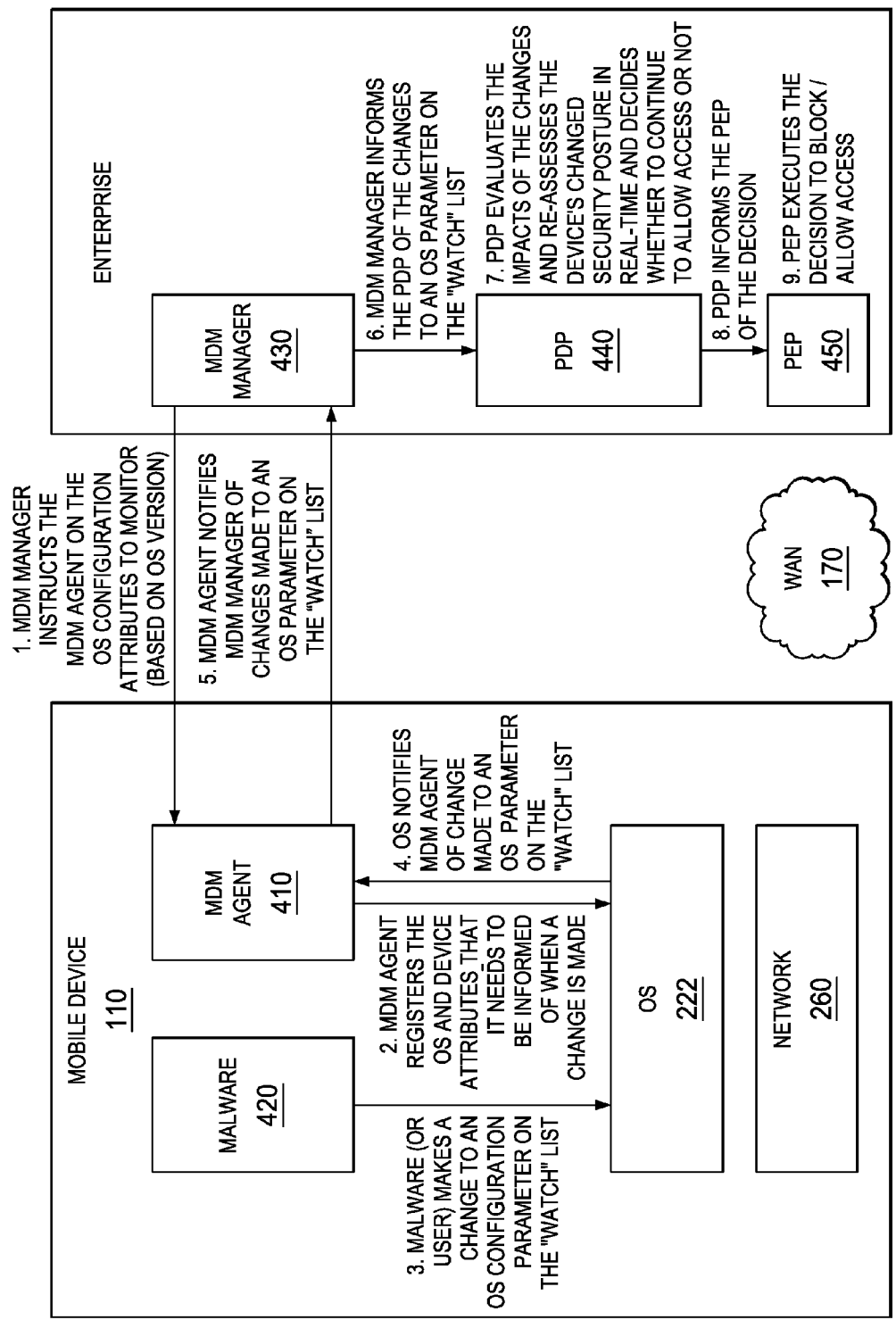
FIG. 4 is a signal flow diagram of mobile device management according to one or more examples of the present Specification.

In certain embodiments, server engine 324 may comprise an MDM server engine, a PDP 440 of FIG. 4, a PEP 450 of FIG. 4, an identity provider engine, and/or a device security posture assessment engine, by way of non-limiting example. These functions may be provided separately in many different physical machines, or together in a single machine in appropriate circumstances.

Peripheral interface 340 may be configured to interface with any auxiliary device that connects to server 300 but that is not necessarily a part of the core architecture of server 300. A peripheral may be operable to provide extended functionality to server 300, and may or may not be wholly dependent on server 300. Peripherals may include, by way of non-limiting examples, any of the peripherals disclosed in FIG. 2.

FIG. 4 is a signal flow diagram of mobile device management according to one or more examples of the present specification.

In the example of FIG. 4, an MDM agent 410 is installed on mobile device 110. In operation 1, MDM manager 430 instructs MDM agent 410 concerning the operating system configuration and attributes that are to be monitored. These may be based, for example, on operating system version or other device attributes.

In operation 2, MDM agent 410 registers with operating system 222 the operating system and device attributes that may constitute changes in mobile security posture. MDM agent 410 may be informed of these events when any changes made.

In operation 3, by way of example, a malware object 420 makes a change to OS configuration or some other parameter on the watchlist of security posture change events. It should be noted that malware is provided only by way of example. In other examples, block 420 may be a candidate malicious object that has not yet been classified, or block 420 may represent a user-initiated change to the mobile device. Thus, block 420 should be broadly understood to encompass any driver of a mobile device security posture change.

In operation 4, operating system 222 notifies MDM agent 410 of the change to the parameter on the watchlist. In some examples, this may include waking MDM agent 410 from a "sleep" mode.

In operation 5, MDM agent 410 notifies MDM manager 430 of the changes that have been made to the parameter on the watchlist.

In operation 6, MDM manager 430 notifies policy decision point (PDP) 440 of the changes.

In operation 7, PDP 440 evaluates the impact of the changes and reassesses the devices security posture in real-time. PDP 440 may then construct a new policy for the device, including whether, and to what extent, to continue to allow the device to access enterprise resources.

In operation 8, PDP 440 informs a policy enforcement point (PEP) 450 of the decision.

In operation 9, PEP 450 enforces the decision including blocking and/or allowing access to various enterprise resources.

In other embodiments, PEP 450 may propagate back to MDM agent 410 instructions to take action on mobile device 110. For example, if mobile device 110 can no longer be treated as a trusted device, then PEP 450 may instruct MDM agent 410 to take appropriate security actions, such as deleting stored emails, revoking access to an email server, and/or deleting or encrypting stored enterprise data.

Figure 5:
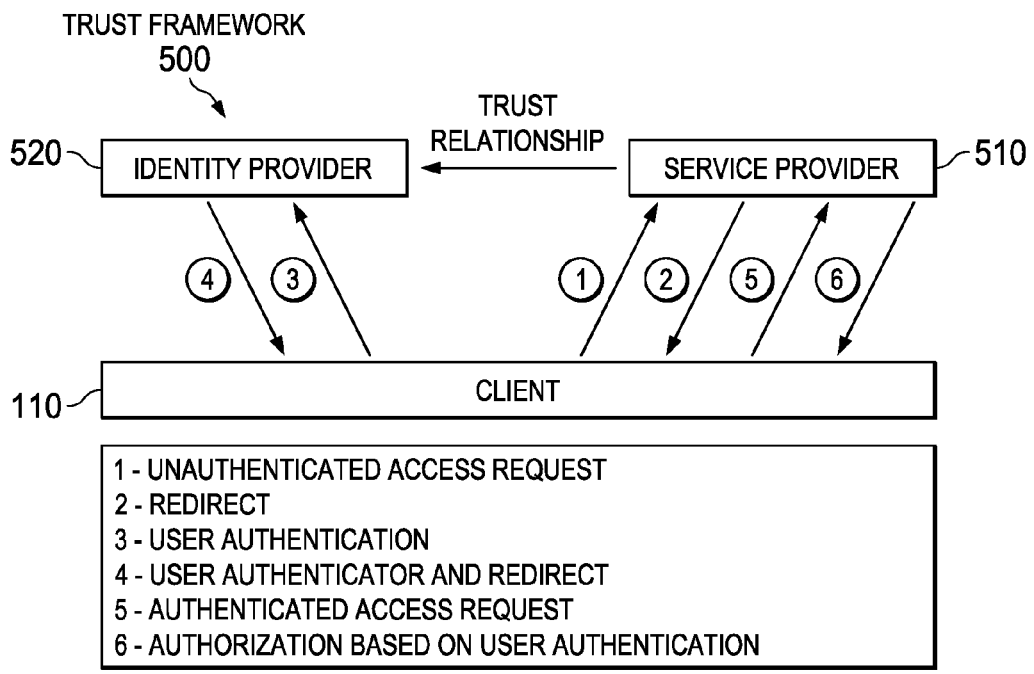
FIG. 5 is a block diagram of a trust framework according to one or more examples of the present Specification.

FIG. 5 is a signal flow diagram of a trust framework 500 according to one or more examples of the present specification. In certain embodiments of trust framework 500 of FIG. 5, authentication may include third-party authentication, such as via SAML.

By way of example, in operation 1, client device 110 provides an unauthenticated access request to service provider 510. Service provider 510 in this context may be one of enterprise security controller 140, a SaaS provider providing enterprise-class services, or any other service provider that the user requires access to.

In operation 2, service provider 510 provides a redirect instruction back to client 110, pointing client 110 to identity provider 520, which has a trust relationship with service provider 510.

In operation 3, client 110 provides authentication to identity provider 520. This may include, for example, a username and password, security token, or multi-factor authentication.

In operation 4, identity provider 520 provides authentication (including, for example, an authentication token) and a redirect instruction to client 110. Client 110 may now possess a security token that authenticates it as genuine to service provider 510.

In operation 5, client 110 may now provide an authenticated access request to service provider 510. Service provider 510 has a trust relationship with identity provider 520, and may verify a security token provided by client 110.

In operation 6, once service provider 510 has verified the authentication token, service provider 510 may grant authorization based on the authentication.

Figure 6:
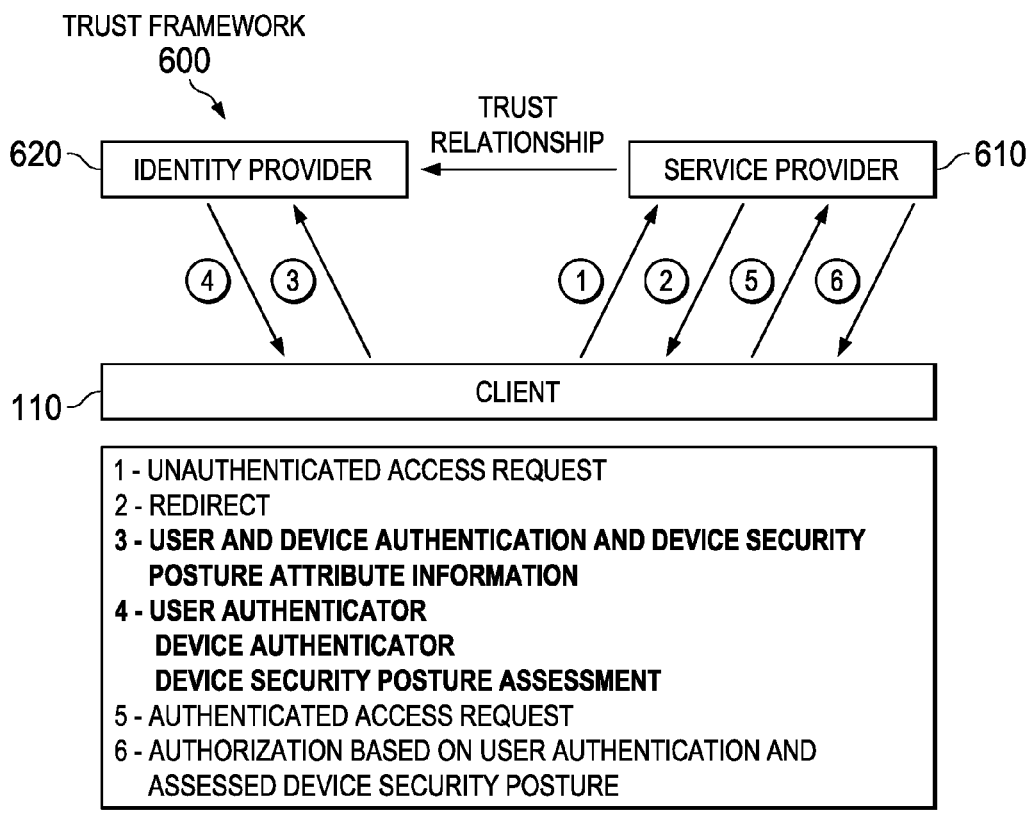
FIG. 6 is a block diagram of a trust framework according to one or more examples of the present Specification.

FIG. 6 is a block diagram of a modified trust framework 600 according to one or more examples of the present specification.

In trust framework 600, operations 1 and 2 may be substantially identical to operations 1 and 2 of trust framework 500.

In operation 3, client 110 may provide a joint user-and-device authentication, and optionally a device security posture packet, to identity provider 620. Identity provider 620 may be specially configured to handle such joint authentication and device security posture attribute information.

In this case, in operation 4, when identity provider 620 sends an authentication token back to client 110, it may also include a device-authenticator, and a device security posture assessment.

The remaining operations of trust framework 600 may be essentially identical to trust framework 500. However, in this case, service provider 610 receives not only authentication for user 120, but also authentication for device 110, and an updated device security posture assessment. Thus, in operation 6, service provider 610 may grant or revoke access depending on the combination of user authentication, device authentication, and device security posture assessment.

Figure 7:
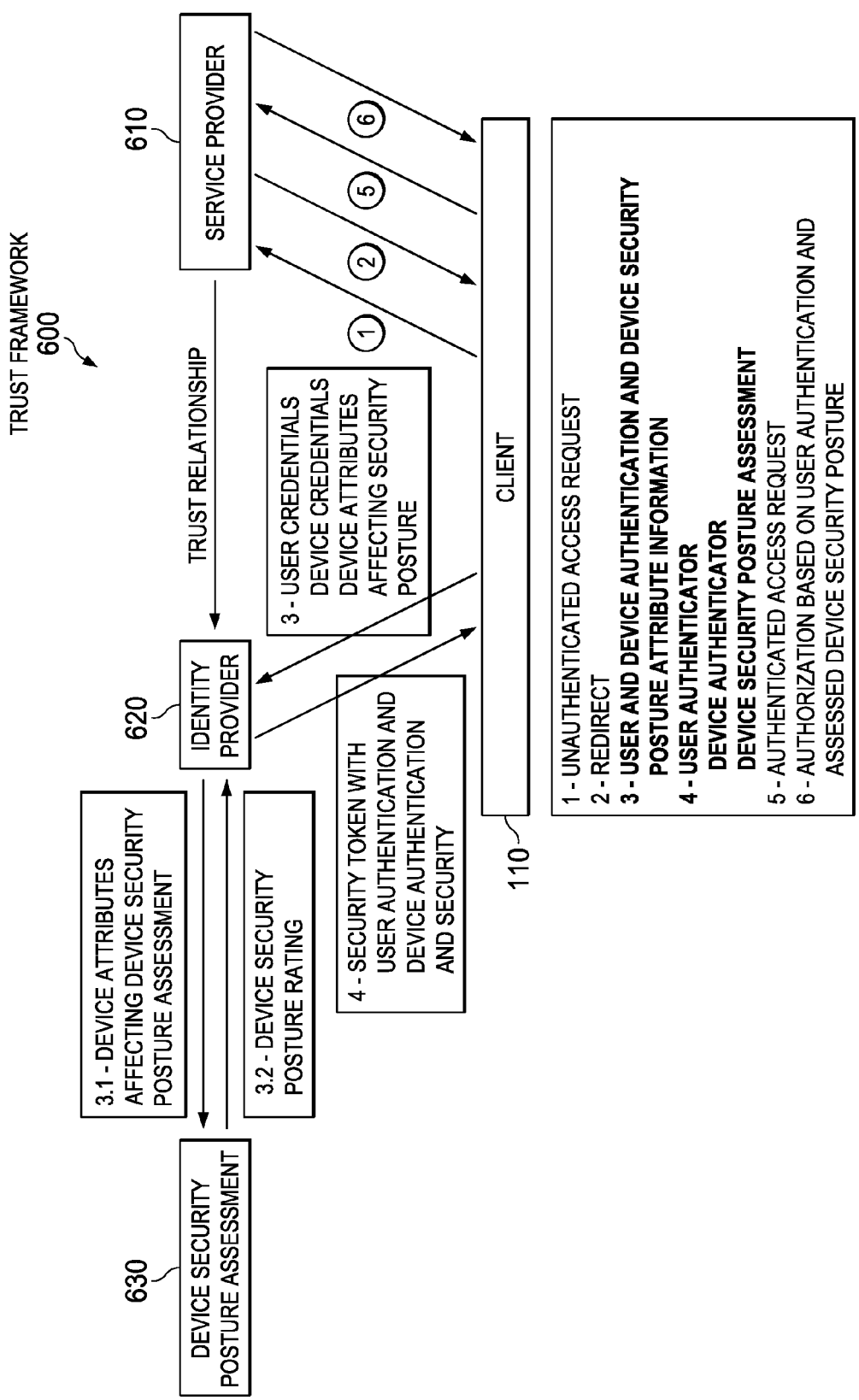
FIG. 7 is a signal flow diagram of a trust framework according to one or more examples of the present Specification.

FIG. 7 is an additional block diagram of a trust framework 600 according to one or more examples of the present specification.

In this example, identity provider 620 may be a legacy SAML identity provider. In that case, identity provider 620 may not be configured to handle the additional information provided in trust framework 600. Thus, identity provider 520 may establish an additional relationship with a device security posture assessment server 630. This may be an additional identity provider, which may be configured specifically to handle the additional information in trust framework 600. Thus, in certain embodiments, trust framework 600 can operate effectively with legacy SAML servers by the provision of an additional device security posture assessment server 630.

In the example of FIG. 7, operations 1 and 2 may be essentially identical to operations 1 and 2 of FIG. 5 and FIG. 6.

Operation 3 is similar to operation 3 of FIG. 6. Client 110 provides to identity provider 620 a joint user-and-device authentication packet, and may also provide device security posture attribute information. However, in this case, identity provider 620 does not provide logic for handling the extra device authentication and device security posture information of operation 3.

Thus, in operation 3.1, identity provider 620 provides to device security posture assessment 630 device attributes affecting the device security posture assessment.

In operation 3.2, device security posture assessment 630 provides back to identity provider 620 a device security posture rating.

Identity provider may in some examples simply append the device authentication and device security posture rating to the authentication token it provides to client 110. Thus, identity provider 620 does not need to include logic for handling device security posture ratings. Rather, identity provider 620 need only know to append the additional information, whatever it is, to the authentication token.

Because identity provider 620 and device security posture assessment 630 have together constructed a proper authentication packet for trust framework 600, operation 4 may be essentially identical to operation 4 of FIG. 6. Identity provider 620 provides the modified authentication packet to client 110. Operations 5 and 6 may then be essentially identical to operations 5 and 6 of FIG. 5 and FIG. 6.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

The particular embodiments of the present disclosure may readily include a system on chip (SOC) central processing unit (CPU) package. An SOC represents an integrated circuit (IC) that integrates components of a computer or other electronic system into a single chip. It may contain digital, analog, mixed-signal, and radio frequency functions: all of which may be provided on a single chip substrate. Other embodiments may include a multi-chip-module (MCM), with a plurality of chips located within a single electronic package and configured to interact closely with each other through the electronic package. In various other embodiments, the digital signal processing functionalities may be implemented in one or more silicon cores in Application Specific Integrated Circuits (ASICs), Field Programmable Gate Arrays (FPGAs), and other semiconductor chips.

Additionally, some of the components associated with described microprocessors may be removed, or otherwise consolidated. In a general sense, the arrangements depicted in the figures may be more logical in their representations, whereas a physical architecture may include various permutations, combinations, and/or hybrids of these elements. It is imperative to note that countless possible design configurations can be used to achieve the operational objectives outlined herein. Accordingly, the associated infrastructure has a myriad of substitute arrangements, design choices, device possibilities, hardware configurations, software implementations, equipment options, etc.

Any suitably-configured processor component can execute any type of instructions associated with the data to achieve the operations detailed herein. Any processor disclosed herein could transform an element or an article (for example, data) from one state or thing to another state or thing. In another example, some activities outlined herein may be implemented with fixed logic or programmable logic (for example, software and/or computer instructions executed by a processor) and the elements identified herein could be some type of a programmable processor, programmable digital logic (for example, a field programmable gate array (FPGA), an erasable programmable read only memory (EPROM), an electrically erasable programmable read only memory (EEPROM)), an ASIC that includes digital logic, software, code, electronic instructions, flash memory, optical disks, CD-ROMs, DVD ROMs, magnetic or optical cards, other types of machine-readable mediums suitable for storing electronic instructions, or any suitable combination thereof. In operation, processors may store information in any suitable type of non-transitory storage medium (for example, random access memory (RAM), read only memory (ROM), field programmable gate array (FPGA), erasable programmable read only memory (EPROM), electrically erasable programmable ROM (EEPROM), etc.), software, hardware, or in any other suitable component, device, element, or object where appropriate and based on particular needs. Further, the information being tracked, sent, received, or stored in a processor could be provided in any database, register, table, cache, queue, control list, or storage structure, based on particular needs and implementations, all of which could be referenced in any suitable timeframe. Any of the memory items discussed herein should be construed as being encompassed within the broad term 'memory.'

Computer program logic implementing all or part of the functionality described herein is embodied in various forms, including, but in no way limited to, a source code form, a computer executable form, and various intermediate forms (for example, forms generated by an assembler, compiler, linker, or locator). In an example, source code includes a series of computer program instructions implemented in various programming languages, such as an object code, an assembly language, or a high-level language such as OpenCL, Fortran, C, C++, JAVA, or HTML for use with various operating systems or operating environments. The source code may define and use various data structures and communication messages. The source code may be in a computer executable form (e.g., via an interpreter), or the source code may be converted (e.g., via a translator, assembler, or compiler) into a computer executable form.

In one example embodiment, any number of electrical circuits of the FIGURES may be implemented on a board of an associated electronic device. The board can be a general circuit board that can hold various components of the internal electronic system of the electronic device and, further, provide connectors for other peripherals. More specifically, the board can provide the electrical connections by which the other components of the system can communicate electrically. Any suitable processors (inclusive of digital signal processors, microprocessors, supporting chipsets, etc.), memory elements, etc. can be suitably coupled to the board based on particular configuration needs, processing demands, computer designs, etc. Other components such as external storage, additional sensors, controllers for audio/video display, and peripheral devices may be attached to the board as plug-in cards, via cables, or integrated into the board itself. In another example embodiment, the electrical circuits of the FIGURES may be implemented as stand-alone modules (e.g., a device with associated components and circuitry configured to perform a specific application or function) or implemented as plug-in modules into application specific hardware of electronic devices.

Note that with the numerous examples provided herein, interaction may be described in terms of two, three, four, or more electrical components. However, this has been done for purposes of clarity and example only. It should be appreciated that the system can be consolidated in any suitable manner. Along similar design alternatives, any of the illustrated components, modules, and elements of the FIGURES may be combined in various possible configurations, all of which are clearly within the broad scope of this Specification. In certain cases, it may be easier to describe one or more of the functionalities of a given set of flows by only referencing a limited number of electrical elements. It should be appreciated that the electrical circuits of the FIGURES and its teachings are readily scalable and can accommodate a large number of components, as well as more complicated/sophisticated arrangements and configurations. Accordingly, the examples provided should not limit the scope or inhibit the broad teachings of the electrical circuits as potentially applied to a myriad of other architectures.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "steps for" are specifically used in the particular claims; and (b) does not intend, by any statement in the specification, to limit this disclosure in any way that is not otherwise reflected in the appended claims.

Example Implementations

There is disclosed in an example, a computing apparatus, comprising: a network interface; and a mobile device management (MDM) agent operable for: receiving a certificate from a service provider; determining that a security posture change event has occurred; notifying an MDM server engine of the security posture change event; receiving a security modification instruction from the MDM server engine; and acting on the security modification instruction.

There is further disclosed an example, wherein the MDM agent is further operable for providing a joint user-and-device authentication token to an identity provider.

There is further disclosed an example, further comprising an operating system, and wherein the MDM agent is further operable for registering the security posture change event with the operating system.

There is further disclosed an example, wherein the MDM agent is further operable receiving notification of the security posture change event from the operating system.

There is further disclosed an example, wherein the MDM agent is further operable to run as a background process.

There is further disclosed an example, wherein the MDM agent is further operable to run as a background process with elevated privileges.

There is further disclosed an example, wherein the MDM agent is further operable to run within a trusted execution environment (TEE).

There is further disclosed an example, wherein the security posture change event is installation of a program.

There is further disclosed an example, wherein the security posture change event is uninstallation of a program.

There is further disclosed an example, wherein the security posture change event is encountering a candidate malicious object encountered.

There is further disclosed an example, wherein the security posture change event is change in location.

There is further disclosed an example, wherein the security posture change event is connecting to an unsecured network.

There is further disclosed an example, wherein the security posture change event is a change in biometric data.

There is further disclosed in an example, a security posture assessment apparatus, comprising: a network interface; and one or more logic elements comprising a security posture assessment engine operable for: receiving via the network interface an authentication request for a mobile device; receiving via the network interface device attributes relevant to a mobile security posture; and constructing a device security posture rating.

There is further disclosed an example, wherein the security posture assessment engine is further operable for providing a joint response comprising a user authenticator, a device authenticator, and a device security posture assessment.

There is further disclosed an example, wherein receiving the authentication request comprises receiving the authentication request from a third-party identity provider.

There is further disclosed an example, wherein the third-party identity provider is a security assertion markup language (SAML) identity provider.

There is further disclosed an example, wherein receiving the authentication request comprises receiving the authentication request from a service provider.

There is further disclosed an example, further comprising an identity provider engine for authenticating the mobile device to the service provider.

There is further disclosed an example, wherein the identity provider engine is a security assertion markup language (SAML) identity provider engine operable for providing SAML services.

There is further disclosed an example, wherein the security posture assessment engine is further operable for receiving a security token for the mobile device.

There is further disclosed an example, wherein the security token comprises a username and password.

There is further disclosed an example, wherein the security token comprises a two-factor authentication token.

There is further disclosed in an example, a server apparatus, comprising: a network connection; and one or more logic elements comprising a mobile device management (MDM) engine operable for: instructing an MDM agent to register a mobile security posture event; receiving from the MDM agent an instance of the mobile security posture event; constructing a policy decision responsive at least in part to the mobile security posture event; and enforcing the policy decision.

There is further disclosed an example, wherein the mobile device management engine is further operable for: receiving a joint user/device authentication request from the MDM agent; redirecting the joint user/device authentication request to an identity provider; receiving from the identity provider a joint user/device authentication response; and acting on the joint user/device authentication response.

There is further disclosed in an example, a method comprising performing the instructions disclosed in any of the examples.

There is further disclosed in an example, an apparatus comprising means for performing the method of any of the examples.

There is further disclosed an example, wherein the apparatus comprises a processor and memory.

There is further disclosed in an example, an apparatus further comprising a computer-readable medium having stored thereon software instructions for performing the method of any of the examples.

What is claimed is:

1. A non-enterprise computing device for accessing enterprise computing resources, comprising:
a network interface;
an operating system; and
logic, including at least a processor and a memory, comprising a mobile device management (MDM) agent operable for providing the non-enterprise computing device conditional access to enterprise resources, comprising:
registering with an MDM server of an enterprise the non-enterprise computing device as a non-enterprise computing device lacking enterprise control of software installation, and receiving a certificate configured to provide access to resources of the enterprise;
receiving from the MDM server instructions regarding a security posture to monitor;
registering a security posture event with the operating system;
entering a sleep mode;
waking after receiving from the operating system a notification of a security posture change event;
notifying the MDM server of the security posture change event;
receiving a security modification instruction from the MDM server; and
enforcing the security modification instruction on the computing apparatus.

2. The non-enterprise computing device for accessing enterprise computing resources of claim 1, wherein the MDM agent is further operable for providing a joint user-and-device authentication token to an identity provider.

3. The non-enterprise computing device for accessing enterprise computing resources of claim 1, wherein the MDM agent is further operable for receiving notification of the security posture change event from the operating system.

4. The non-enterprise computing device for accessing enterprise computing resources of claim 1, wherein the MDM agent is further operable to run as a background process.

5. The non-enterprise computing device for accessing enterprise computing resources of claim 1, wherein the MDM agent is further operable to run as a background process with elevated privileges.

6. The non-enterprise computing device for accessing enterprise computing resources of claim 1, wherein the MDM agent is further operable to run within a trusted execution environment (TEE).

7. The non-enterprise computing device for accessing enterprise computing resources of claim 1, wherein the security posture change event is installation of a program.

8. The non-enterprise computing device for accessing enterprise computing resources of claim 1, wherein the security posture change event is uninstallation of a program.

9. The non-enterprise computing device for accessing enterprise computing resources of claim 1, wherein the security posture change event is encountering a candidate malicious object.

10. The non-enterprise computing device for accessing enterprise computing resources of claim 1, wherein the security posture change event is a change in location.

11. The non-enterprise computing device for accessing enterprise computing resources of claim 1, wherein the security posture change event is connecting to an unsecured network.

12. The non-enterprise computing device for accessing enterprise computing resources of claim 1, wherein the security posture change event is a change in biometric authentication.

13. One or more tangible, non-transitory computer-readable storage mediums having stored thereon executable instructions for a computing apparatus to provide a mobile device management (MDM) agent operable for providing the non-enterprise computing device conditional access to enterprise resources, comprising:
registering with an MDM server of an enterprise the non-enterprise computing device as a non-enterprise computing device lacking enterprise control of software installation, and receiving a certificate configured to provide access to resources of the enterprise, via a network interface;
receiving from the MDM manager server instructions regarding a security posture to monitor;
registering a security posture event with an operating system;
entering a sleep mode;
waking after receiving from the operating system a notification of a security posture change event;
notifying the MDM server of the security posture change event via the network interface;
receiving a security modification instruction from the MDM server; and
enforcing the security modification instruction on the computing apparatus.

14. The one or more tangible, non-transitory computer-readable mediums of claim 13, wherein the MDM agent is further operable for providing a joint user-and-device authentication token to an identity provider.

15. The one or more tangible, non-transitory computer-readable mediums of claim 13, wherein the MDM agent is further operable for receiving notification of the security posture change event from the operating system.

16. The one or more tangible, non-transitory computer-readable mediums of claim 13, wherein the MDM agent is further operable to run as a background process.

17. The one or more tangible, non-transitory computer-readable mediums of claim 13, wherein the MDM agent is further operable to run as a background process with elevated privileges.

18. The one or more tangible, non-transitory computer-readable mediums of claim 13, wherein the MDM agent is further operable to run within a trusted execution environment (TEE).

19. The one or more tangible, non-transitory computer-readable mediums of claim 13, wherein the security posture change event is installation of a program.

20. The one or more tangible, non-transitory computer-readable mediums of claim 13, wherein the security posture change event is uninstallation of a program.

21. The one or more tangible, non-transitory computer-readable mediums of claim 13, wherein the security posture change event is encountering a candidate malicious object.

22. A computer-implemented method of providing mobile device management (MDM), comprising:
registering with an MDM server of an enterprise a non-enterprise computing device as a non-enterprise computing device lacking enterprise control of software installation, and receiving a certificate configured to provide access to resources of an enterprise, via a network interface;

receiving from the MDM server instructions regarding a security posture to monitor;

registering a security posture event with the operating system;

entering a sleep mode;

waking after receiving from the operating system a notification of a security posture change event;

notifying the MDM server of the security posture change event via the network interface;

receiving a security modification instruction from the MDM server; and enforcing the security modification instruction.

23. The method of claim 22, further comprising providing a joint user-and-device authentication token to an identity provider.

* * * * *